United States Patent
Azoulay et al.

(10) Patent No.: US 8,967,175 B2
(45) Date of Patent: Mar. 3, 2015

(54) PRESSURE MANAGEMENT HYDRAULIC CONTROL VALVE

(75) Inventors: Moshe Azoulay, Kibbutz Evron (IL); Zvi Barkan, Kibbutz Evron (IL); Zvi Weingarten, Kibbutz Evron (IL)

(73) Assignee: Bermad CS Ltd., Kibbutz Evron (IL)

( * ) Notice: Subject to any disclaimer, the term of this patent is extended or adjusted under 35 U.S.C. 154(b) by 755 days.

(21) Appl. No.: 13/202,982

(22) PCT Filed: Feb. 18, 2010

(86) PCT No.: PCT/IB2010/050718
§ 371 (c)(1),
(2), (4) Date: Aug. 24, 2011

(87) PCT Pub. No.: WO2010/097734
PCT Pub. Date: Sep. 2, 2010

(65) Prior Publication Data
US 2011/0303301 A1    Dec. 15, 2011

(30) Foreign Application Priority Data

Feb. 26, 2009   (IL) .......................................... 197320

(51) Int. Cl.
| | |
|---|---|
| G05D 16/08 | (2006.01) |
| F16K 31/124 | (2006.01) |
| F16K 31/128 | (2006.01) |
| F16K 31/40 | (2006.01) |
| F16K 37/00 | (2006.01) |

(52) U.S. Cl.
CPC .............. *F16K 31/124* (2013.01); *F16K 31/128* (2013.01); *F16K 31/40* (2013.01); *F16K 37/0008* (2013.01)

USPC ................ 137/2; 137/14; 137/82; 137/556.3; 137/489; 137/492.5

(58) Field of Classification Search
USPC ................... 137/553–556.6, 489, 492, 492.5, 137/82–86, 1, 2, 14; 251/33–46
See application file for complete search history.

(56) References Cited

U.S. PATENT DOCUMENTS

| | | | |
|---|---|---|---|
| 2,301,041 A | | 9/1939 | Hann |
| 2,399,938 A | * | 5/1946 | Pett ............................... 137/487 |
| 2,763,986 A | * | 9/1956 | Block ......................... 60/39.281 |
| 2,812,774 A | * | 11/1957 | Anderson et al. ............. 137/489 |
| 3,021,724 A | * | 2/1962 | Seger ........................... 74/568 R |
| 5,447,174 A | | 9/1995 | Bourkel |
| 6,925,958 B2 | | 8/2005 | Groeneveld |

* cited by examiner

*Primary Examiner* — William McCalister
(74) *Attorney, Agent, or Firm* — Mark M. Friedman

(57) ABSTRACT

Disclosed are a method and device for modulating the downstream pressure output of a pressure reducing hydraulic control valve in response to the flow demand fluctuation the method comprising. Included is an adjustable pressure pilot valve mechanism having a drive element extending from the control valve. The drive element is displaceable in response to a flow capacity through the hydraulic control valve. Also included is an adjustable pressure pilot valve deployed along a control tube connecting an upstream pressure port to a downstream pressure port, the adjustable pressure pilot valve associated with the drive element such that adjustable settings of the adjustable pressure pilot valve are responsive to displacement of the drive element.

12 Claims, 6 Drawing Sheets

PRESSURE MANAGEMENT HYDRAULIC CONTROL VALVE

FIELD AND BACKGROUND OF THE INVENTION

The present invention relates to hydraulic control valves and, in particular, it concerns a pressure management hydraulic control valve having an adjustable pressure pilot valve mechanism.

It is known in the art of control valves to employ a pilot valve, however, currently the state of the art it to provide non-adjustable preset pilot valves that are non-responsive to the flow demand fluctuation.

There is therefore a need for an adjustable pressure pilot valve mechanism that is responsive to the flow demand fluctuation.

SUMMARY OF THE INVENTION

The present invention is an adjustable pressure pilot valve mechanism that is responsive to the flow demand fluctuation.

According to the teachings of the present invention, there is provided an adjustable pressure pilot valve mechanism for use with a flow control valve, the adjustable pressure pilot valve mechanism comprising: (a) a valve position indicator extending longitudinally from the control valve, the valve position indicator longitudinally displaceable in response to a flow capacity through the valve; (b) a cam deployed on, and displaceable with, the valve position indicator; and (c) an adjustable pressure pilot valve associated with the valve position indicator and the cam, the adjustable pressure pilot valve deployed along a control tube connecting an upstream pressure port to a downstream pressure port; wherein at least one adjustable setting of the adjustable pressure According to a further teaching of the present invention, there is also provided: (a) a pressure regulating lever; and (b) a roller extending from the pressure regulating level so as to interact with a sloped shoulder of the cam such that during the displacement of the cam a position of at least a portion of the pressure regulating lever is varied; wherein the adjustable setting of the adjustable pressure pilot valve is responsive to the variation of the position of at least a portion of the pressure regulating lever.

According to the teachings of the present invention, there is also provided a spring associated with the adjustable pressure pilot valve such that the variation of the position of at least a portion of the pressure regulating lever varies a load of the spring and the adjustable setting of the adjustable pressure pilot valve are responsive to the load of the spring.

According to a further teaching of the present invention, the cam is configured with an adjustable shoulder so as to allow variation of a slope of the sloped shoulder.

According to a further teaching of the present invention, the cam is configured as a substantially cylindrical element mounted longitudinally on the position indication such that the position indicator is a central axis of the cylinder, cylindrical element the having a radially sloping end face, such that an angle of a slope of the sloping end face is varied along a circumference of the sloping end face.

According to a further teaching of the present invention, a location of the deployment of the cam on the valve position indicator is longitudinally variable.

According to a further teaching of the present invention, a location of the roller on the pressure regulating level is longitudinally variable so as to correspond to the location of the cam on the valve position indicator.

According to a further teaching of the present invention, at least one adjustment characteristic for the adjustable setting of the adjustable pressure pilot valve is determined by a slope of the cam shoulder.

There is also provided according to the teachings of the present invention, a method for modulating the downstream pressure output of a pressure reducing hydraulic control valve in response to the flow demand fluctuation, the method comprising: (a) providing an adjustable pressure pilot valve mechanism including: (i) a drive element extending from the control valve, the drive element displaceable in response to a flow capacity through the hydraulic control valve; and (ii) an adjustable pressure pilot valve deployed along a control tube connecting an upstream pressure port to a downstream pressure port, the adjustable pressure pilot valve associated with the drive element such that adjustable settings of the adjustable pressure pilot valve are responsive to displacement of the drive element; (b) initiating flow through the hydraulic control valve; and (c) automatically displacing the drive element in response to a flow capacity through the hydraulic control valve, thereby adjusting the adjustable settings of the adjustable pressure pilot valve.

According to a further teaching of the present invention, the drive element is implemented as a valve position indicator extending longitudinally from the hydraulic control valve, the valve position indicator longitudinally displaceable in response to a flow capacity through the valve.

According to the teachings of the present invention, there is also provided: (iii) a cam deployed on, and displaceable with, the valve position indicator; (iv) a pressure regulating lever; and (v) a roller extending from the pressure regulating level so as to interact with a sloped shoulder of the cam such that during the displacement of the cam a position of at least a portion of the pressure regulating lever is varied; wherein the adjustable setting of the adjustable pressure pilot valve are responsive to the variation of the position of at least a portion of the pressure regulating lever; (vi) a spring associated with the adjustable pressure pilot valve such that the variation of the position of at least a portion of the pressure regulating lever varies a load of the spring and the adjustable setting of the adjustable pressure pilot valve are responsive to the load of the spring.

According to the teachings of the present invention, there is also provided: (a) providing the cam implemented with an adjustable shoulder so as to allow variation of a slope of the sloped shoulder; and (b) adjusting the slope of the sloped shoulder.

According to a further teaching of the present invention, the cam is implemented as a substantially cylindrical element having a radially sloping end face, such that an angle of a slope of the sloping end face is varied along a circumference of the sloping end face.

According to the teachings of the present invention, there is also provided determining at least one adjustment characteristic for the adjustable setting of the adjustable pressure pilot valve by a slope of the cam shoulder.

There is also provided according to the teachings of the present invention, an adjustable slope cam for use with an adjustable pressure pilot valve, adjustable settings of the adjustable pressure pilot valve being responsive to displacement of the cam, the adjustable slope cam comprising a cam body configured as a substantially cylindrical element having a radially sloping end face, such that an angle of a slope of the sloping end face is varied along a circumference of the sloping end face; wherein rotation of at least a portion of the cam body about a longitudinal axis of the substantially cylindrical element varies a slope of the radially sloping end face to which the adjustable settings of the adjustable pressure pilot valve are responsive.

According to a further teaching of the present invention, the cam body is configured with a first section that is rotatable about the longitudinal axis and a second section that is non-rotatable.

According to a further teaching of the present invention, the cam is deployed on, and displaceable with, a valve position indicator extending longitudinally from a flow control valve, the valve position indicator longitudinally displaceable in response to a flow capacity through the valve.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is pressure management hydraulic control valve having an adjustable pressure pilot valve mechanism that is responsive to the flow demand fluctuation.

The principles and operation of a pressure management hydraulic control valve having an adjustable pressure pilot valve mechanism according to the present invention may be better understood with reference to the drawings and the accompanying description.

The present invention is a pressure reducing hydraulic control valve, which utilizes an adjustable pressure pilot valve mechanism to modulate its downstream pressure output in response to the flow demand fluctuation.

As the flow capacity through the valve increases, the downstream pressure setting of the valve raises. Likewise, as the flow capacity through the valve decreases, the downstream pressure setting of the valve lowers.

To this end, the pressure management hydraulic control valves of the present invention include a hydraulic control valve 2 to which the adjustable pressure pilot valve mechanism 10 is attached, the adjustable pressure pilot valve mechanism being responsive to the flow demand fluctuation. Discussed herein is the configuration and operation of various embodiments of the adjustable pressure pilot valve mechanism.

Figure 1:
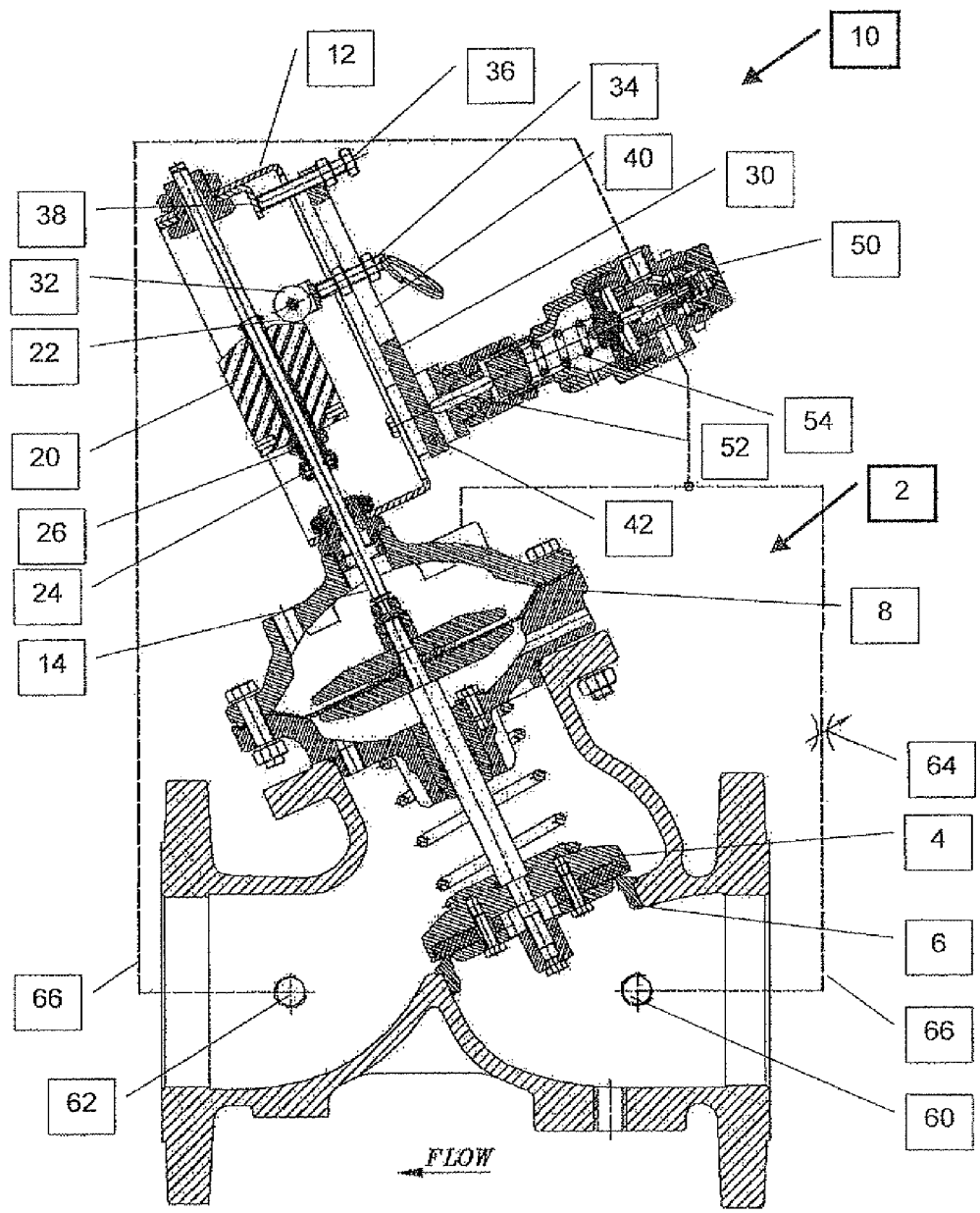
FIG. 1 is a longitudinal cross-sectional view of a pressure management hydraulic control valve constructed and operational according to the teachings of the present invention, shown with a first preferred embodiment of an adjustable pressure pilot valve mechanism that is responsive to the flow demand fluctuation.

Referring now to the drawings, the operation the entire valve assembly is discussed with regard to the embodiment of the present invention illustrated in FIG. 1 is as follows.

FIG. 1 illustrates a diaphragm actuated control valve as is common in the art. A bracket assembly 12 is attached to the bonnet of the actuator housing so as to support adjustable pressure pilot valve 50 as well as an elongated valve position indicator 14 and pressure regulating elements that will be discussed below in more detail.

Attached to the position indicator 14 is a cam 20 that is longitudinally displaced together with the position indicator 14. Therefore, the position indicator 14 acts as a drive element extending from the control valve and is driven in response to the flow capacity through the control valve.

Attached to the bracket assembly 12 is the low pressure stopper 38, the adjustable pressure pilot valve 50 and the pressure regulating lever 30, to which is attached the roller 32. It should be noted that while the drawings herein illustrate the adjustable pressure pilot valve 50 as being directly mounted on the bracket assembly 12, this is not intended as a limitation and other means of association between the adjustable pressure pilot valve 50 and the position indicator, which acts as the drive element, are within the scope of the present invention.

The control tube 66 connects the upstream pressure port 60 to the downstream pressure port 62. In doing so, the control tube passes through a control restriction orifice 64 and the adjustable pressure pilot valve 50.

In operation, as the valve plug 4 lifts and opens above the valve seat 6 in response to the increased flow capacity through the valve 2, the valve position indicator 14 manipulates the settings of the adjustable pressure pilot valve 50.

This is accomplished by a longitudinal displacement of cam 20 mounted on the valve position indicator 14. As the position indicator 14 is longitudinally displaced so to is cam 20. The movements of roller 32 over the cam shoulder 22 causes the regulating lever 30 to be pivotally displaced on pivot pin 42, displacing the push pin 52, thereby changing the load of the spring 54 in the adjustable pressure pilot valve 50, which in turn controls the settings of the adjustable pressure pilot valve 50.

That is to say, as the position indicator 14 and cam 20 are longitudinally displaced, roller 32 rolls across cam shoulder 22 and is radially displaced with regard to position indicator 14. Such radial displacement may be inward or outward in direction. The radial displacement of the roller in turn causes regulating lever 30 to pivot pin 42, displacing the push pin 52 either into or out of the adjustable pressure pilot valve 50. The displacement of pivot pin 42 changes the load of spring 54 in the adjustable pressure pilot valve 50 and it is the load pressure of that directly affects the pressure setting of adjustable pressure pilot valve 50.

It is the adjustable pressure pilot valve 50 that regulates downstream pressure setting transition, moving between a low pressure limit and a high pressure limit.

In such a configuration, a high flow capacity (demand) raises the downstream pressure settings and a diminishing flow demand lowers the downstream pressure settings and valve's pressure output.

It will be understood that bolt 36 sets the low pressure limit, whereas the roller's nut 34 sets the high pressure limit.

It will be appreciated that transition from low pressure setting and high pressure settings, while being responsive to the flow demand fluctuations, may also be affected by position of cam 20 on the valve position indicator 14, the slope of cam shoulder 22 and the distance of the roller 32 from the regulating lever 30.

It will be understood that the position of cam 20 on the valve position indicator 14 may be adjusted by loosening the cam lock nut 26 adjusting the position of the cam primary positioning slider 24 and tightening cam lock nut 26. The desired positioning of the roller 32 in relation to the cam 20 is achieved by longitudinal displacement of the roller assembly within the roller sliding groove 40 and adjusting the distance of the roller 32 from the regulating lever 30 using high pressure setting bolt 34.

It will be readily appreciated by one of skill in the art that different valve applications may require different adjustment characteristics for the settings of the adjustable pressure pilot valve 50 and that at least one such adjustment characteristic may be determined by the slope of cam shoulder 22.

To that end FIGS. 2-5 illustrate various embodiments of the adjustable pressure pilot valve mechanism and in particular variations of the cam and cam shoulders, therefore, those elements of the present invention that remain unchanged in these illustrative drawing are similarly numbered.

The slope of cam shoulder 22 as illustrated in FIG. 1 is relatively steep and the transition between the high pressure setting and the low pressure setting will be rather quick.

Figure 2:
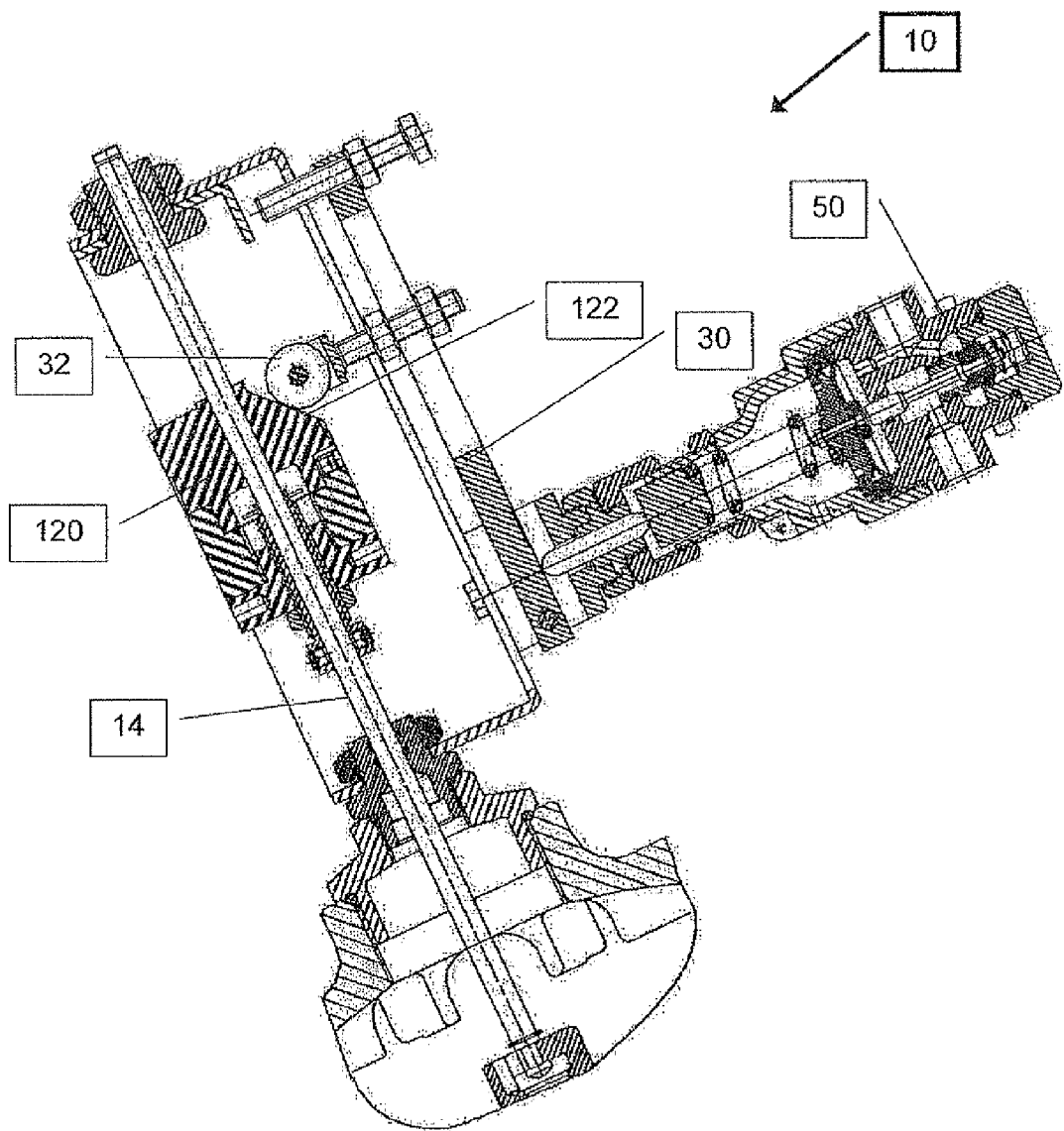
FIG. 2 is a longitudinal cross-sectional detail of a second preferred embodiment of an adjustable pressure pilot valve mechanism that is responsive to the flow demand fluctuation constructed and operational according to the teachings of the present invention.
Figure 3:
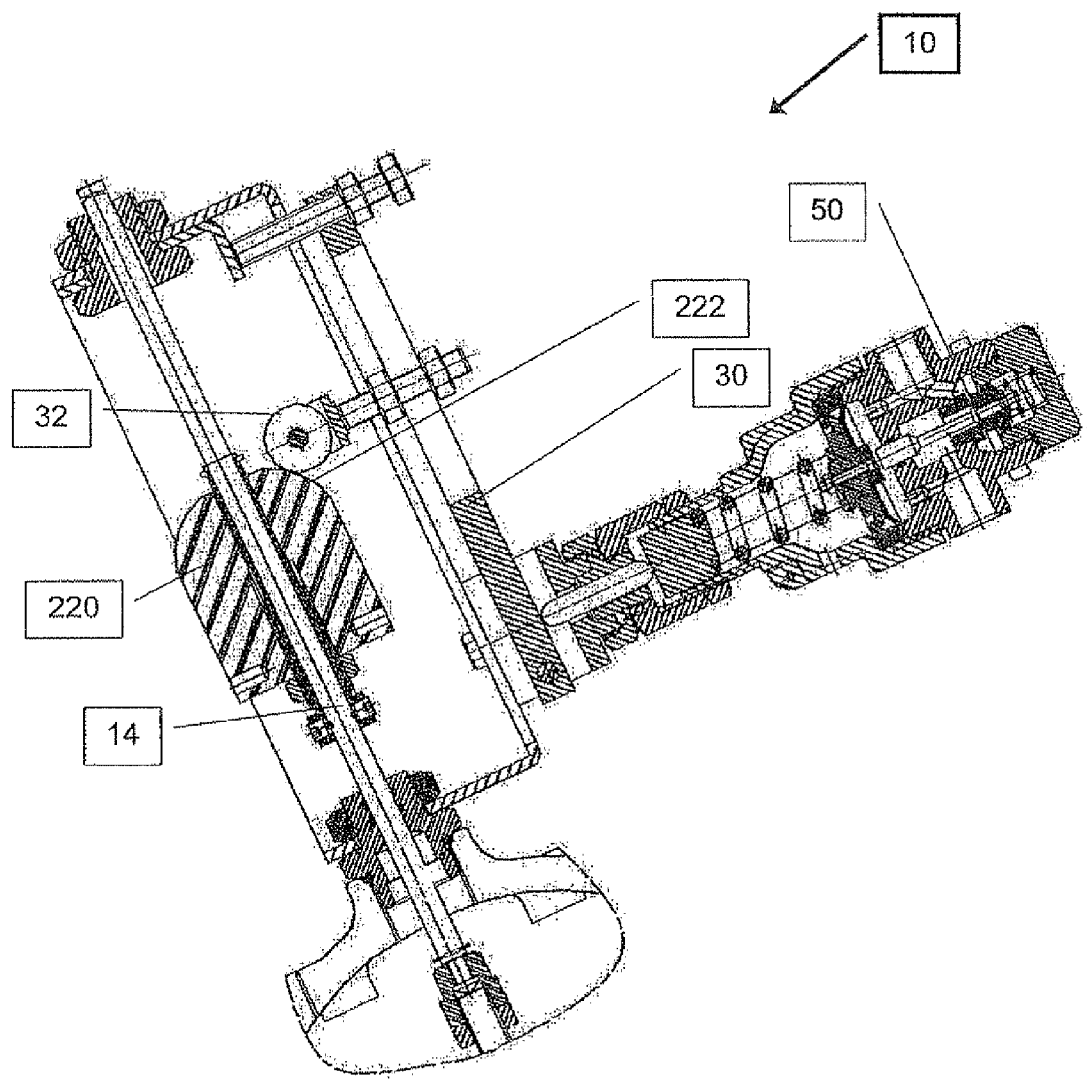
FIG. 3 is a longitudinal cross-sectional detail of a third preferred embodiment of an adjustable pressure pilot valve mechanism that is responsive to the flow demand fluctuation constructed and operational according to the teachings of the present invention.
Figure 4:
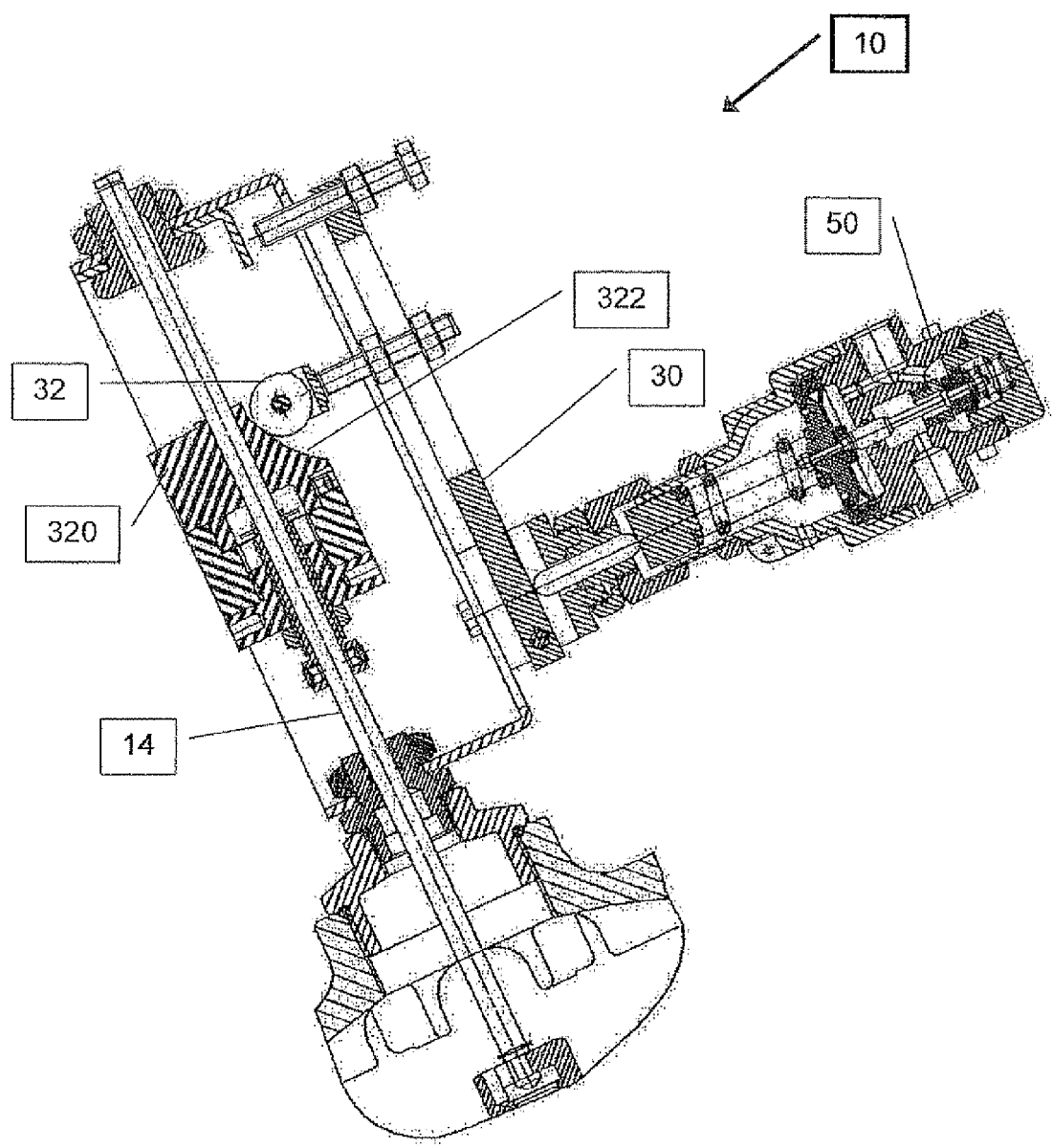
FIG. 4 is a longitudinal cross-sectional detail of a fourth preferred embodiment of an adjustable pressure pilot valve mechanism that is responsive to the flow demand fluctuation constructed and operational according to the teachings of the present invention.

The slope of cam shoulder 122 of cam 120 as illustrated in FIG. 2 is less steep than and the transition between the high pressure setting and the low pressure setting will be slower than the transition of the embodiment of FIG. 1.

The cams 220 and 320 illustrate convex 222 and concave 322 sloped shoulders respectively.

Figures 5, 5A:
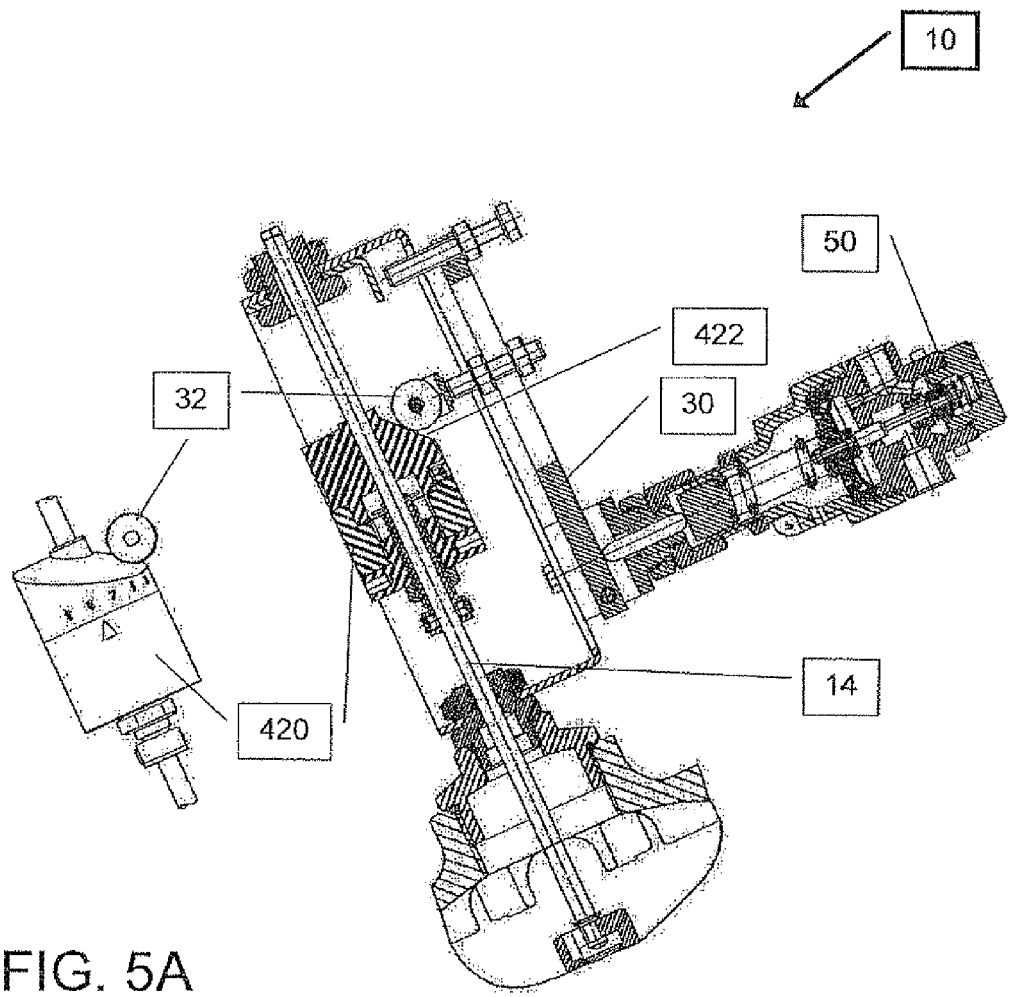
FIG. 5 is a longitudinal cross-sectional detail of a fifth preferred embodiment of an adjustable pressure pilot valve mechanism that is responsive to the flow demand fluctuation constructed and operational according to the teachings of the present invention, having an adjustable cam.
FIG. 5A is a side elevation of the adjustable cam of FIG. 5.
Figure 6:
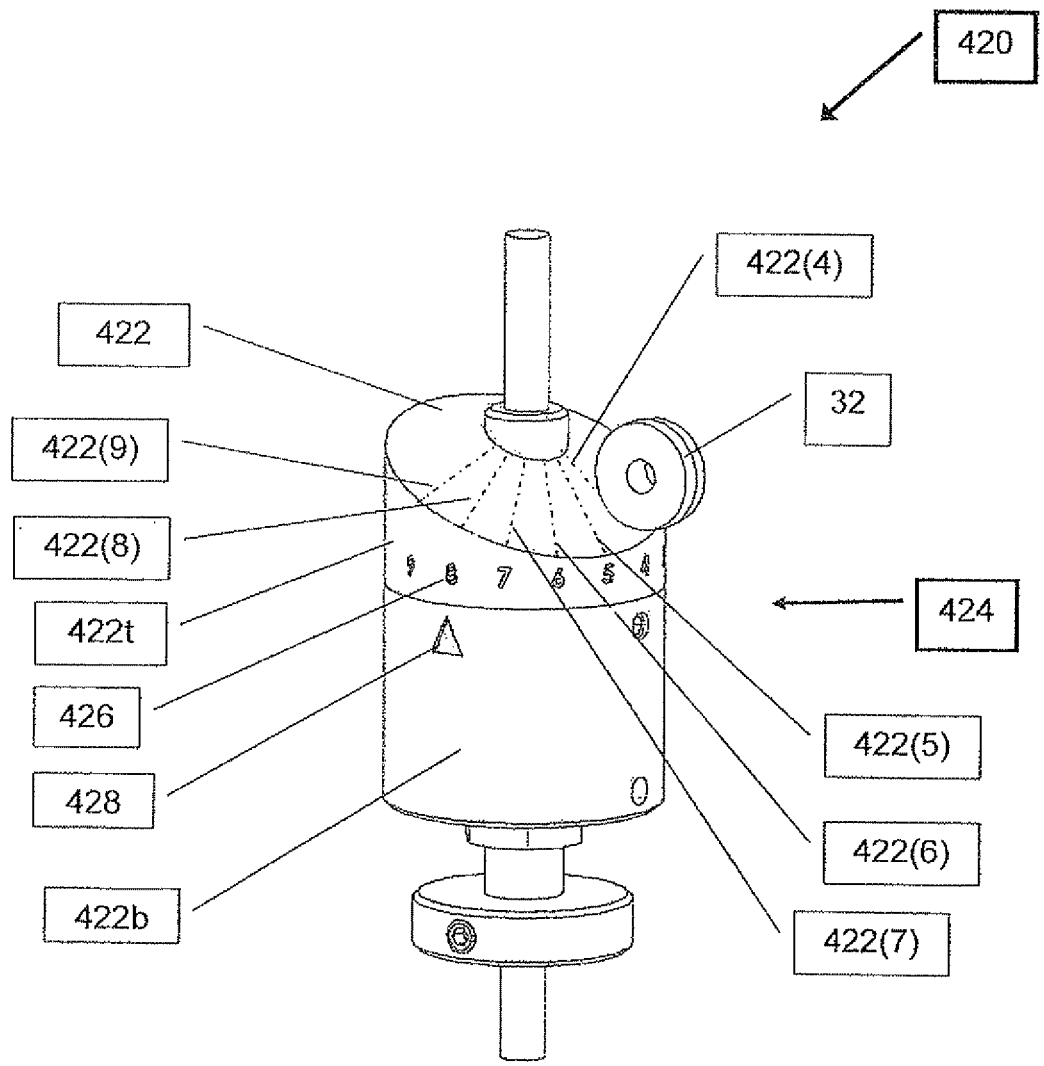
FIG. 6 is an isometric side view of the adjustable cam of FIG. 5.

It will be readily appreciated that while in some applications it may be of benefit to change the slope of the cam shoulder over the life time of the valve by changing cams, such a change would involve considerable time and labor. Therefore, the present invention includes an adjustable slope cam 420 for use with an adjustable pressure pilot valve, as illustrated in FIGS. 5-6, that is configured with an adjustable slope that varies the slope of the cam to which the adjustable settings of the adjustable pressure pilot valve are responsive.

The cam body 424 is configured as a substantially cylindrical element having a radially sloping end face 422, such that an angle of a slope of the sloping end face 422 is varied along a circumference of the sloping end face 422.

In the embodiment illustrated here, rotation of the cam top section 422t in relation to the cam bottom section 422b changes the slope of the portion of the shoulder, as illustrated by dashed lines (422(4)-420(9)), that interacts with roller 32. It should be noted that the slope setting indicators 426 and 428 shown here are for illustrative purposes only and substantially any suitable indicators are within the scope of the present invention.

It should be noted that the terms "top" and "bottom" have been used herein in reference to the direction of the drawings and are not to be considered as limitations to the scope or design of the present invention.

It will be appreciated that the above descriptions are intended only to serve as examples and that many other embodiments are possible within the spirit and the scope of the present invention.

What is claimed is:

1. An adjustable pressure pilot valve mechanism for use with a flow control valve, the adjustable pressure pilot valve mechanism comprising:
    (a) a valve position indicator extending longitudinally from the control valve, said valve position indicator longitudinally displaceable in response to a flow capacity through the valve;
    (b) a cam deployed on, and displaceable with, said valve position indicator;
    (c) an adjustable pressure pilot valve associated with said valve position indicator and said cam, said adjustable pressure pilot valve deployed along a control tube connecting an upstream pressure port to a downstream pressure port;
    (d) a pressure regulating lever; and
    (e) a roller extending from said pressure regulating lever so as to interact with a sloped shoulder of said cam such that during said displacement of said cam a position of at least a portion of said pressure regulating lever is varied;
    wherein at least one adjustable setting of said adjustable pressure pilot valve is responsive to displacement of said cam and to said variation of said position of at least a portion of said pressure regulating lever.

2. The adjustable pressure pilot valve mechanism of claim 1, further including a spring associated with said adjustable pressure pilot valve such that said variation of said position of at least a portion of said pressure regulating lever varies a load of said spring and said adjustable setting of said adjustable pressure pilot valve is responsive to said, load of said spring.

3. The adjustable pressure pilot valve mechanism of claim 1, wherein said sloped shoulder of said cam is an adjustable shoulder so as to allow variation of a slope of said sloped shoulder.

4. The adjustable pressure pilot valve mechanism of claim 3, wherein said cam is configured as a cylindrical element mounted longitudinally on said position indicator such that said position indicator is located along a central axis of said cylinder, said sloped shoulder having a radially sloping end face, such that an angle of a slope of said sloping end face is varied along a circumference of said sloping end face.

5. The adjustable pressure pilot valve mechanism of claim 1, wherein a location of said deployment of said cam on said valve position indicator is longitudinally variable.

6. The adjustable pressure pilot valve mechanism of claim 5, wherein a location of said roller on said pressure regulating lever is longitudinally variable so as to correspond to said location of said cam on said valve position indicator.

7. The adjustable pressure pilot valve mechanism of claim 1, wherein at least one adjustment characteristic for said adjustable setting of said adjustable pressure pilot valve is determined by a slope of said sloped shoulder of said cam.

8. A method for modulating the downstream pressure output of a pressure reducing hydraulic control valve in response to the flow demand fluctuation, the method comprising:
    (a) providing an adjustable pressure pilot valve mechanism including:
        (i) a drive element extending from the control valve, said drive element displaceable in response to a flow capacity through the hydraulic control valve; and
        (ii) an adjustable pressure pilot valve deployed along a control tube connecting an upstream pressure port to a downstream pressure port, said adjustable pressure pilot valve associated with said drive element such that adjustable settings of said adjustable pressure pilot valve are responsive to displacement of said drive element;

(iii) a cam deployed on, and displaceable with, said valve position indicator;
(iv) a pressure regulating lever; and
(v) a roller extending from said pressure regulating lever so as to interact with a sloped shoulder of said cam such that during said displacement of said cam a position of at least a portion of said pressure regulating lever is varied;
wherein said adjustable settings of said adjustable pressure pilot valve are responsive to said variation of said position of at least a portion of said pressure regulating lever;
(vi) a spring associated with said adjustable pressure pilot valve such that said variation of said position of at least a portion of said pressure regulating lever varies a load of said spring and said adjustable settings of said adjustable pressure pilot valve are responsive to said load of said spring;
(b) initiating flow through the hydraulic control valve; and
(c) automatically displacing said drive element in response to a flow capacity through the hydraulic control valve, thereby adjusting said adjustable settings of said adjustable pressure pilot valve.

9. The method of claim 8, wherein said drive element is implemented as a valve position indicator extending longitudinally from the hydraulic control valve, said valve position indicator longitudinally displaceable in response to a flow capacity through the valve.

10. The method of claim 8, further including:
(a) providing said cam implemented such that said sloped shoulder is an adjustable shoulder so as to allow variation of a slope of said sloped shoulder; and
(b) adjusting said slope of said sloped shoulder.

11. The method of claim 10, wherein said cam is implemented as a cylindrical element such that the sloped shoulder has a radially sloping end face, and such that an angle of a slope of said sloping end face is varied along a circumference of said sloping end face.

12. The method of claim 8, further including determining at least one adjustment characteristic for said adjustable setting of said adjustable pressure pilot valve by a slope of said sloped shoulder of said cam.

\* \* \* \* \*